Figure 1:
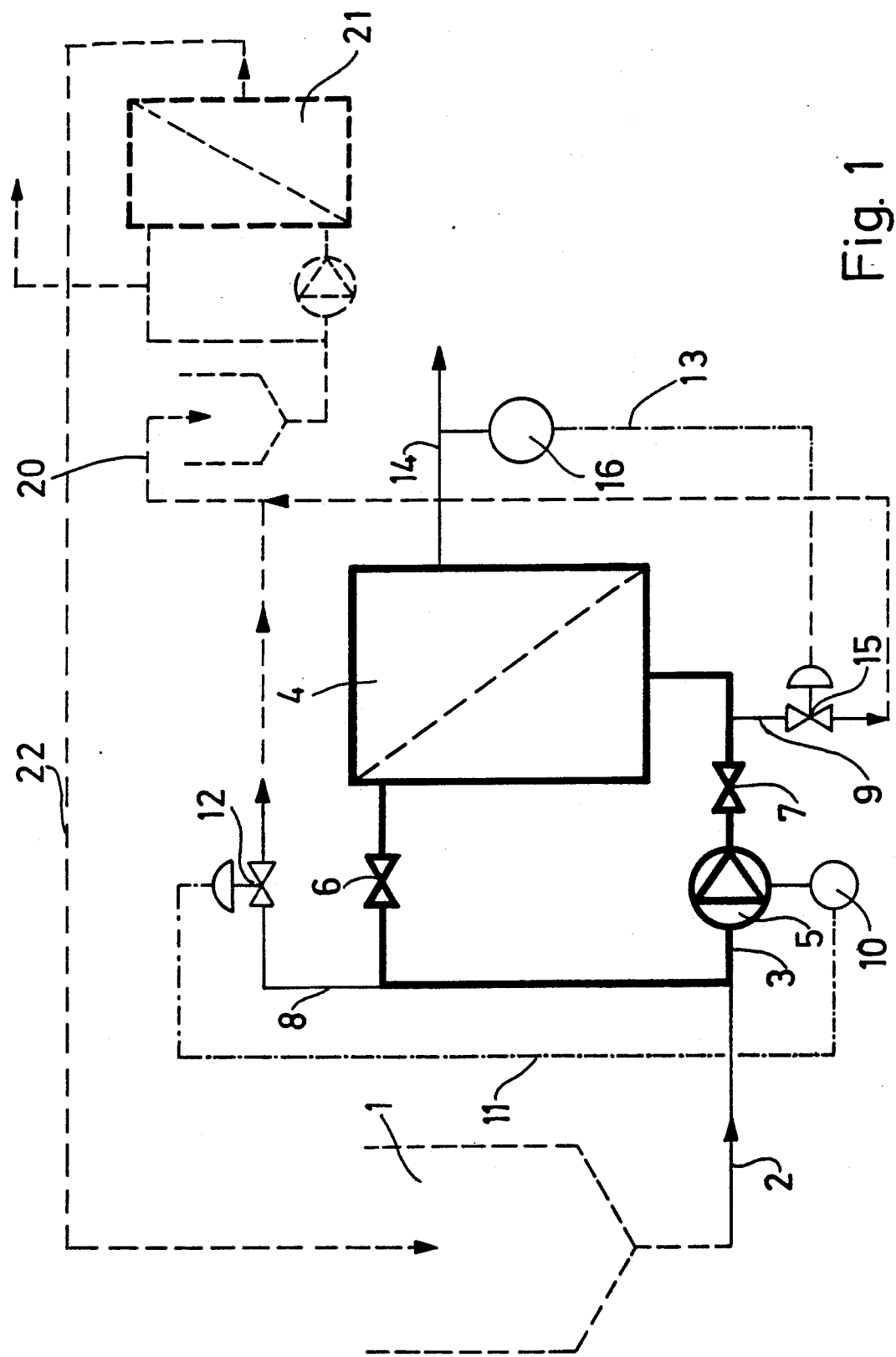

United States Patent [19]

Hartmann

[11] Patent Number: 5,112,489
[45] Date of Patent: May 12, 1992

[54] PROCESS AND UNIT FOR CLARIFICATION OF LIQUIDS

[75] Inventor: Eduard Hartmann, Schneisingen, Switzerland

[73] Assignee: Bucher-Guyer AG Maschinenfabrik, Niederweningen, Switzerland

[21] Appl. No.: 725,084

[22] Filed: Jul. 3, 1991

[30] Foreign Application Priority Data

Jul. 4, 1990 [CH] Switzerland .................. 02216/90

[51] Int. Cl.⁵ .............. B01D 61/14; B01D 61/18; B01D 61/22
[52] U.S. Cl. .................. 210/637; 210/195.2; 210/257.2
[58] Field of Search ............ 210/195.2, 257.2, 321.65, 210/637, 634, 644, 649

[56] References Cited

U.S. PATENT DOCUMENTS 4,689,153 8/1987 Follmann et al. ............... 210/195.2

Primary Examiner—Frank Sever
Attorney, Agent, or Firm—Edmund M. Jaskiewicz

[57] ABSTRACT

In a process for clarification of liquids, especially raw juice by continuous crosscurrent filtration, which for improvement of the filtration output is run with a high solid portion in the retentate circulating circuit, during the starting phase an additional retentate discharge from the retentate circulating circuit takes place, which is relatively small in comparison with the retentate discharge taking place during the stationary operating phase. By this measure, a further improvement of the filtration output is achieved.

18 Claims, 2 Drawing Sheets

PROCESS AND UNIT FOR CLARIFICATION OF LIQUIDS

The invention relates to a process and a unit for clarification of liquids, especially raw juice from plant products and products produced by bioengineering, by continuous crosscurrent filtration, especially microfiltration and ultrafiltration with a high solid portion in the retentate circulating circuit.

With juice obtained from plant products both alcoholic and nonalcoholic raw juices can be involved, such as, e.g., raw juice from fruit, grapes, berries or other produce and vegetables as well as oil seeds for obtaining oil. Suitable also are products derived from several plant products, e.g., beer, especially in connection with beer recovery from fermenter and tank lager yeast.

By WO 89/02708 it is known in the clarification of liquids to run with a high solid portion in the retentate circulating circuit. In this way the aim is pursued to improve the filtration output of the membranes. During the starting phase of the production course, the solid portion in the retentate circulating circuit constantly increases. In this case the filtration output first decreases and then increases to a higher value. During this starting phase no retentate circulating circuit is removed. But as soon as the highest value of the filtration output is reached, the solid portion is kept constant by uniform removal of retentate from the circuit during the stationary operating phase to keep the filtration output at the final condition which is characterized by a substantially higher filtration output in comparison with the starting value. The regulation of the retentate discharge takes place in this case as a function of the measured filtration output or values derived from it.

In these known processes the starting phase under certain circumstances can last relatively long. This is the case, if the starting filtration output of the membranes is relatively low, or if the intermediate conditions occur with relatively low filtration output. Another reason can consist in the fact that only limited solid portions are present in the raw juice, e.g., less than 0.5% of wet pulp. If these conditions are present individually or combined, the starting phase can last, e.g., over 5 hours up to 24 hours. Caused by the circulation and the mechanical stress of the retentate linked with it, structural changes can occur in the retentate with the result that after the desired high pulp concentration in the retentate is reached, no improvement of the filtration output occurs and the output may even decrease dramatically.

The object of the invention is to avoid said disadvantages and to improve even more the initially mentioned process from the economic aspect and to increase the filtration output.

According to the invention this object is achieved in that during the starting phase at least one additional retentate discharge from the retentate circulating circuit takes place, which is relatively small in comparison with the retentate discharge occurring during the stationary operating phase.

Other features and advantageous configurations of the invention can be gathered from the claims.

As tests have shown, with the additional retentate discharge according to the invention during the starting phase, despite the limited amount being discharged, the retentate in the circulating circuit is sufficiently renewed so that in difficult cases, i.e., if the starting phase lasts relatively long, the effect of the filtration output improvement with high pulp portion in the retentate in most cases occurs in the filtration especially of apple juice and other fruit juices.

Figure 2:
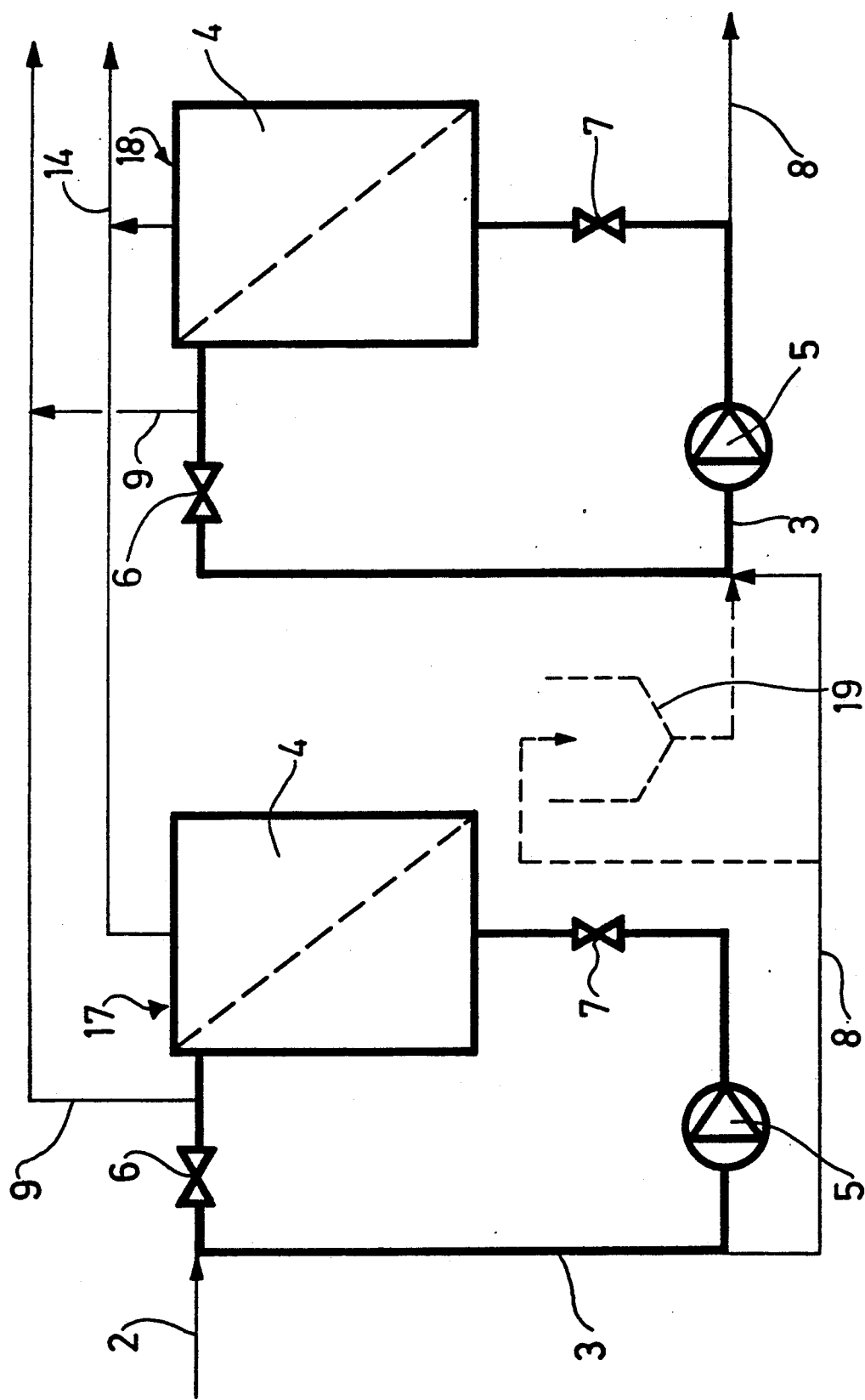

The invention is explained in greater detail in the following description and drawing, which represents an embodiment. There are shown in:

FIG. 1, a diagrammatic representation of a one-stage continuous crosscurrent filtration unit for performing the process according to the invention and FIG. 2, the crosscurrent filtration unit according to FIG. 1 in two-stage embodiment.

As FIG. 1 shows, the raw juice is fed from a tank 1 by a pipe 2 to retentate circulating circuit 3 of a one-stage continuously operating crosscurrent filtration device 4, which preferably is designed as an ultrafiltration or microfiltration device. A circulating pump 5, a step output valve 6 and a step input valve 7 are placed in retentate circulating circuit 3. Looked at in the circulation direction, between step output valve 6 and circulating pump 5 a retentate discharge pipe 8 branches off, which constantly removes retentate during the stationary operating phase. Another retentate discharge pipe 9 is placed between step input valve 7, which is downstream from circulating pump 5, and crosscurrent filtration device 4. A relatively limited amount of retentate is removed from retentate circulating circuit 3 by retentate discharge pipe 9 during the starting phase of the production process. To obtain optimal operating condition, during the stationary operating phase the amount of retentate removed by retentate discharge pipe 8 preferably should amount at least 10 times the amount of retentate, which is removed by retentate discharge pipe 9 during the starting phase. For example, the ratio can be about 30:1. This relatively limited amount of retentate discharge is sufficient during the starting phase to renew the retentate in retentate circulating circuit 3.

Retentate discharge pipes 8 and 9 are preferably provided for a separate retentate discharge during the stationary operating phase and the starting phase. But a common retentate discharge pipe could also be used for both operating conditions with different discharge amounts but in most cases was connected with difficulties in regulating the relatively small amount during the starting phase. Retentate discharge pipe 9, because of the limited amount of retentate discharge, can be placed without disadvantages at any spot of circulating circuit 4.

To regulate the amount of retentate discharge during the stationary operating phase, the solid portion in retentate circulating circuit 4 preferably, because this method is the simplest, is measured by a value dependent on the solid portion. As represented in the embodiment according to FIG. 1, for this purpose the power input of circulating pump 5 at specific constant, hydraulic operating conditions, e.g., pressures, circulating amount, measured with an ammeter 10 and the amount measured by a control pipe 11 for regulating a regulating valve 12 placed in retentate discharge pipe 8 is used. Because of the sizable amount of the retentate to be removed it would be difficult in many cases to obtain a stable regulation if the retentate discharge takes place in the area of the measuring section between circulating pump 5 and step output valve 6.

Therefore retentate discharge pipe 8 preferably is placed in the low-pressure part of retentate circulating circuit 3 between step output valve 6 and circulating pump 5.

Another possibility for measuring the solid portion in retentate circulating circuit 3 during the stationary operating phase is the measurement of the pressure difference between module input and module output of crosscurrent filtration device 4 at constant amount of flow. Further the amount of flow through a module of crosscurrent filtration device 4 at constant pressure difference or vice verse can be used as measuring value.

The retentate discharge during the starting phase can takes place both in a stationary manner or, especially at very small discharge amounts, also in a pulsed manner. The regulation of the amount of retentate being discharged in a stationary or pulsed manner by retentate discharge pipe 9 during the starting phase takes place as a function of permeate output F, preferably of the time change of permeate output F (differential dF/dt or practically difference quotient F/t). For this purpose a control pipe 13 of a measuring point 16 at permeate discharge pipe 14 of crosscurrent filtration device 4 leads to a regulating valve 15 placed in retentate discharge pipe 9. Measuring point 16, located in control pipe 13, for determining permeate output F, serves regulating valve 15 influenced by derived measuring value dF/dd.

Crosscurrent filtration device 4 can be also designed in many stages. In the embodiment according to FIG. 2 it consists of a two-stage continuously operating unit with stages 17 and 18. Preferably the retentate discharges take place during the starting phase for each stage separately by the respective retentate discharge pipes 9 outward from the entire system. But in particular cases, a common conducting into the next higher stage is also possible.

The transfer of the retentate from stage 17 to stage 18 takes place for the same, regulating reasons as in the embodiment according to FIG. 1 respectively from the low-pressure side to the low-pressure side of individual retentate circulating circuit 4. The next stage, in embodiment according to FIG. 2, stage 18, therefore is operated at least on the low-pressure side with a pressure a little lower than the preceding stage optionally to be able to eliminate a booster pump if the transfer does not take place by a feed pump. Another alternative is the insertion of a small, pressureless buffer tank 19 between individual stages 17 and 18 (alternative represented in dotted lines in FIG. 2).

The multistage crosscurrent filtration in practice is appropriate only if to obtain a very high yield the run is to be made with extremely high solid portions. The higher stages are suitably equipped with modules, which exhibit substantially enlarged ducts and/or are suitable for operating at higher pressures, e.g., by the use of metal membranes.

Parallel filtration represents a more efficient alternative for multistage filtration. This solution is represented in dotted lines in FIG. 1 as an alternative embodiment. The retentate currents removed by retentate discharge pipes 8 and 9 can be fed by a common pipe 20 to a recycling crosscurrent filtration device 21 with a very high pulp concentration. Thus also at the same time the basically highly liquid retentate from the starting phase can be concentrated and thus the total yield improved. The permeate of recycling crosscurrent filtration device 21 can be recycled by pipe 22 into tank 1.

Both in the embodiment according to FIG. 1 and in the embodiment according to FIG. 2 separate retentate discharge pipes 8 and 9 exhibit a different dimensioning for the stationary operating phase and the starting phase. The ratio of the pipe cross section for the retentate discharge during the stationary phase and starting phase is preferably at least 10:1. For example, the pipe cross section of retentate discharge pipe 8 can be 30 times the pipe cross section of retentate discharge pipe 9.

The retentate discharge from retentate discharge pipe 9 for the starting phase takes place automatically using devices, which are especially suitable for discharge of relatively small amounts, such as, e.g., feed pumps, especially membrane feed pumps, pulse-controlled valves, etc. The control of these control elements takes place by a controller. As measuring value preferably the permeate output or the differential according to its time or the difference quotient is used. But in simple cases, the removal of a constant small amount of retentate, which optionally is readjusted by hand, is sufficient.

I claim:

1. Process for clarification of liquids, especially raw juice from plant products and products produced by bioengineering, by continuous crosscurrent filtration, especially microfiltration and ultrafiltration with a high solid portion in the retentate circulating circuit, characterized in that during the starting phase at least one additional retentate discharge from the retentate circulating circuit takes place, which is relatively small in comparison with retentate discharge occurring during the stationary operating phase sufficient to renew the retentate in the retentate circulating circuit during the starting phase for improving filtration output.

2. Process according to claim 1, wherein the ratio of the retentate discharge during the stationary operating phase to the retentate discharge during the starting phase preferably is greater than 10, e.g., 30.

3. Process according to claim 1, wherein a separate retentate discharge each is preferably provided for the starting phase and the stationary operating phase.

4. Process according to claim 1, wherein the retentate discharge during the starting phase can take place at any spot in the retentate circulating circuit.

5. Process according to claim 1, wherein the retentate discharge during the stationary operating phase preferably takes place in the low-pressure part of the retentate circulating circuit.

6. Process according to claim 1, wherein the regulation of the amount of discharged retentate takes place in a stationary or pulsed manner during the starting phase as a function of the permeate output.

7. Process according to claim 1, wherein the regulation of the amount of discharged retentate takes place in a stationary or pulsed manner during the starting phase preferably as a function of the time change of the permeate output.

8. Process according to claim 1, wherein the continuous crosscurrent filtration device is designed in one or several stages.

9. Process according to claim 8, wherein with multistage systems preferably all retentate discharges during the starting phase are discharged outward from the individual stages.

10. Process according to claim 8, wherein the transfer of retentate in multistage systems takes place from one stage to the next stage respectively from low-pressure side to low-pressure side of the individual retentate circulating circuits.

11. Process according to claim 10, wherein the next stage preferably is operated at least on the low-pressure side with a little lower pressure than the preceding stage.

12. Process according to claim 10, wherein a relatively small pressureless buffer tank is placed between the individual stages.

13. Process according to claim 10, wherein the higher stages are equipped with modules, which exhibit basically enlarged ducts and/or are suitable for operating at higher pressures, e.g., metal membranes.

14. Process according to claim 1, wherein at least a parallel filtration is performed as an alternative for multistage filtration.

15. An apparatus for the clarification of liquids, particularly raw juices from plant products and products produced by bioengineering, comprising a cross current filtration device having at least one stage and having a retentate side and a permeate side, a retentate circuit connected to said retentate side of said cross current filtration device, a source of raw juice connected to said retentate circuit, a first retentate discharge pipe connected to said retentate circuit adjacent its outlet from the cross current filtration device to remove retentate during a stationary operating phase, a second retentate discharge pipe connected to said retentate circuit downstream of said first retentate discharge pipe, the cross sectional area of said first retentate discharge pipe being several times greater than that of the second retentate discharge pipe such that a limited amount of retentate is removed through said second retentate pipe during the starting phase sufficient to renew the retentate in the retentate circulating circuit during the starting phase for improving filtration output.

16. Unit according to claim 15, wherein the ratio of the pipe cross sections of retentate discharge pipe of the stationary operating phase to the retentate discharge pipe of the starting phase is greater than 10, e.g., 30.

17. Unit according to claim 15, wherein the retentate discharge from the pipe for the starting phase takes place automatically by feed pumps, especially membrane feed pumps, pulse-controlled valves or other control units suitable for the removal of the relatively small amounts of liquid.

18. Unit according to claim 17, wherein the control of the control units for removal of the retentate takes place by a controller, and as measuring value preferably the permeate output or the differential according to its time derived from it or the corresponding difference quotient is used.

* * * * *